United States Patent [19]
Murphy

[11] Patent Number: 5,984,778
[45] Date of Patent: Nov. 16, 1999

[54] PERSONALIZATION/BAR CODED TAGS

[75] Inventor: Sharon M. Murphy, Bay Village, Ohio

[73] Assignee: Moore U.S.A., Inc., Grand Island, N.Y.

[21] Appl. No.: 09/037,924

[22] Filed: Mar. 10, 1998

[51] Int. Cl.[6] .............................. G01V 15/00; G09F 3/00
[52] U.S. Cl. ................ 462/22; 283/79; 283/80; 283/81; 462/26; 462/27; 462/29; 462/31; 462/32; 462/33; 462/38; 462/46
[58] Field of Search .................. 283/79, 80, 81; 462/26, 22, 27, 29, 31, 32, 33, 38, 46

[56] References Cited

U.S. PATENT DOCUMENTS 5,800,893  9/1998  Harden ........................... 283/81

*Primary Examiner*—Willmon Fridie, Jr.
*Assistant Examiner*—Mark T. Henderson
*Attorney, Agent, or Firm*—Nixon & Vanderhye P.C.

[57] ABSTRACT

A multi-ply business form includes at least a lower ply and an upper ply wherein the upper ply overlies only a portion of the lower ply, leaving a first portion of the lower ply exposed in adjacent relationship to the upper ply. The upper ply has a two part label thereon including a release layer on a relatively small part of the upper ply, and an adhesive label overlying the release layer. The release layer and the adhesive label have information impact printed thereon, while the exposed portion of the lower ply has information non-impact printed thereon. The upper ply is also temporarily adhesively secured to the lower ply along at least two edges of the upper ply.

15 Claims, 4 Drawing Sheets

5,984,778

PERSONALIZATION/BAR CODED TAGS

TECHNICAL FIELD

This invention relates to a business form construction which accepts both impact and non-impact printing in side-by-side relationship on a single form.

BACKGROUND AND SUMMARY OF THE INVENTION

There are circumstances where business forms customers desire to have the option or capability to both impact and non-impact print different kinds of information on a single form. This is particularly true since the advent of bar code technology, the latter being applied via non-impact printing techniques. Bar codes are increasingly found not only on articles themselves, but also on inventory records, labels, receipts and other forms. Oftentimes, however, it is desirable to provide additional variable information such as the names and addresses of senders and recipients on forms by means of impact printers.

In accordance with the present invention, a business form construction capable of receiving both impact and non-impact printing is provided, which form is nevertheless able to be fed continuously through an impact printer without damage or degradation. In the exemplary embodiment, the form generally includes three plies or layers including a lower or base ply in the form of a release sheet. The intermediate ply has an adhesive back overlying the release sheet so that the adhesive back is covered and protected by the release sheet until the form is put into use. The third or top ply overlies only a portion of the intermediate ply. In the exemplary embodiment, which is composed as a waybill, the upper ply comprises a flap which overlies about half of the underlying intermediate ply.

The exposed portion of the intermediate ply accepts non-impact printing. Included on this portion of the intermediate ply is a bar code, as well as other information including, for example, tracking number, telephone (information) number and the like. That portion of the intermediate ply which underlies the top ply or flap is pre-printed by non-impact printing techniques on its upper surface to indicate designated areas for variable information such as the sender's and recipient's addresses, date, amount, tracking number, special instructions and the like. Included on the upper surface of the top ply or flap is a two-part label construction. It is this label assembly which receives variable information via an impact printer. In this regard, the form in accordance with this invention incorporates a conventional carbonless image transfer system well understood by those skilled in the art. Such systems include coatings on the front and/or back of the involved sheets or plies, typically referred to as CF (coated front), CB (coated back) and CF/CB (coated front and back) coatings. The latter is also pre-printed to indicate designated areas for variable information similar to the underlying portion of the intermediate ply. The label assembly includes a label lower part coated on the intermediate ply. More specifically, the lower label part comprises a first coating or film of polyethylene overlaid with a silicone coating and a CF coating. The label upper part comprises a die-cut face stock with adhesive on its underside, along with a silicone coating and a polyethylene film or coating. A CB coating is also applied over the silicone. That portion of the upper surface of the intermediate ply which underlies the top ply or flap is also provided with a CF coating. With this arrangement, when impact printing is applied to the label, the information is transferred not only to the lower label part but also to the intermediate ply.

It will be appreciated that it is necessary to maintain the top flap or ply in a flat orientation while the form is passed through a dot matrix or other impact printer. The flap also needs to withstand the rigors of shipping and handling of the form or forms. At the same time, however, it is necessary to be able to remove the upper ply of the form easily without damaging the flap itself. These three goals are accomplished by the incorporation of glue spots along the transverse edges of the upper flap portion, temporarily adhering the flap portion to the intermediate ply. In addition, a solid glue line extends parallel to the margin of the form, along the left-hand side of the upper flap portion, but to the right of a separation line which defines a marginal stub. This additional use of non-permanent adhesive is temporary in nature, serving only to hold the upper flap in place during processing, but permitting easy removal of the upper flap or ply.

Accordingly, in its broadest aspects, the present invention relates to a multi-ply business form comprising at least a lower ply and an upper ply wherein the upper ply overlies only a portion of the lower ply, leaving a first portion of the lower ply exposed in adjacent relationship to the upper ply; the upper ply having a two part label thereon including a release layer on a relatively small part of the upper ply, and an adhesive label overlying the release layer; the release layer and the adhesive label having information impact printed thereon; wherein the exposed portion of the lower ply has information non-impact printed thereon; and wherein the upper ply is temporarily adhesively secured to the lower ply along at least two edges of the upper ply.

In another aspect, the invention relates to a business form construction in a continuous web wherein plural forms are connected by perforation lines extending in a direction transverse to a feeding direction of the web, each form within the web comprising a base ply having a release coating on an upper surface thereof; an intermediate ply temporarily adhesively secured to the base ply and having non-impact printing at least on an exposed portion of an upper surface thereof; and an upper ply partially overlying the upper surface of the intermediate ply, the upper ply configured to be impact printed in an area adjacent the exposed portion of the intermediate ply.

Other objects and advantages of the subject invention will become apparent from the detailed description which follows.

DETAILED DESCRIPTION OF THE DRAWINGS

Figure 1:
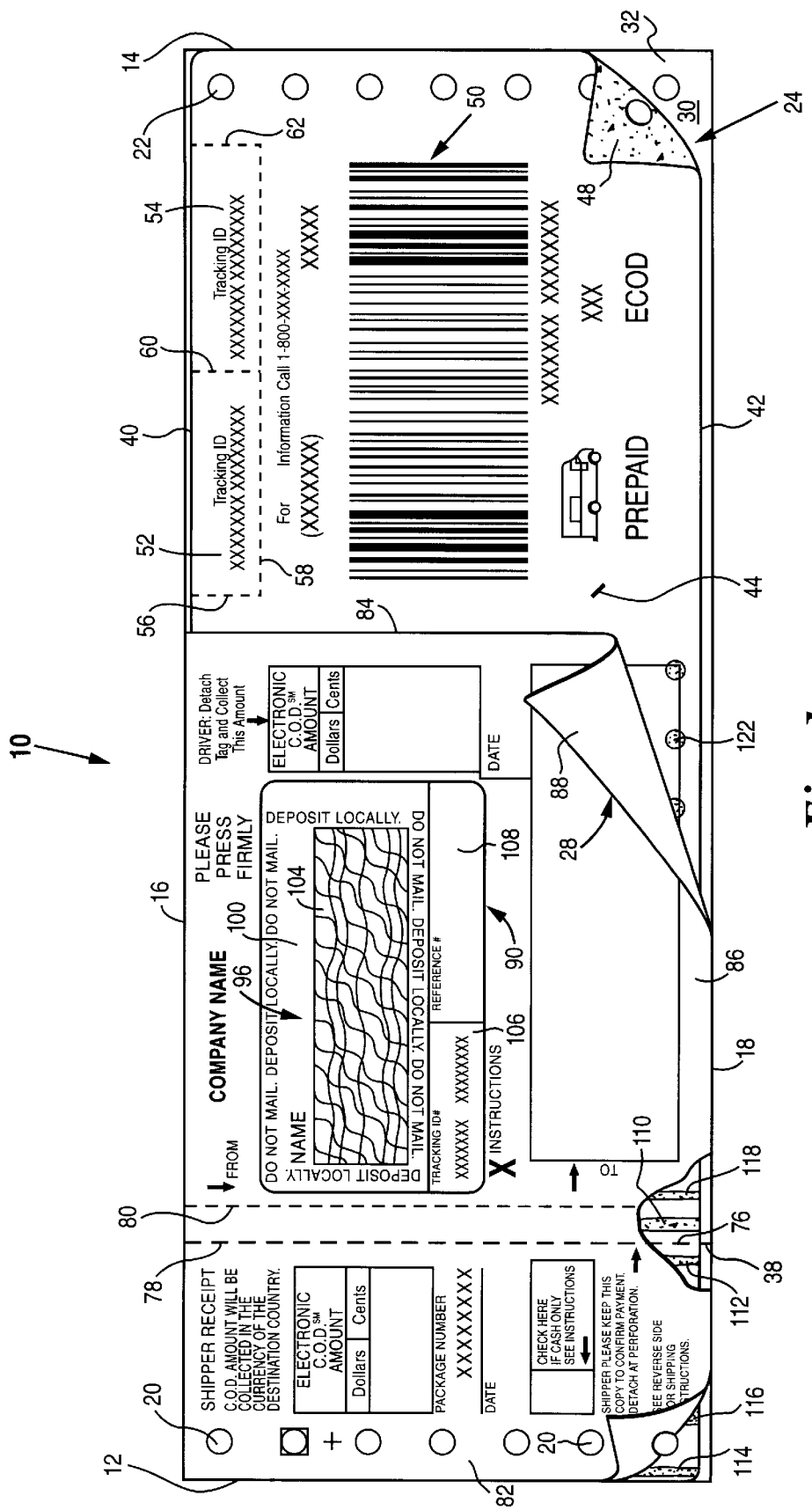
FIG. 1 is a top plan view of a business form in accordance with an exemplary embodiment of the invention.
Figure 2:
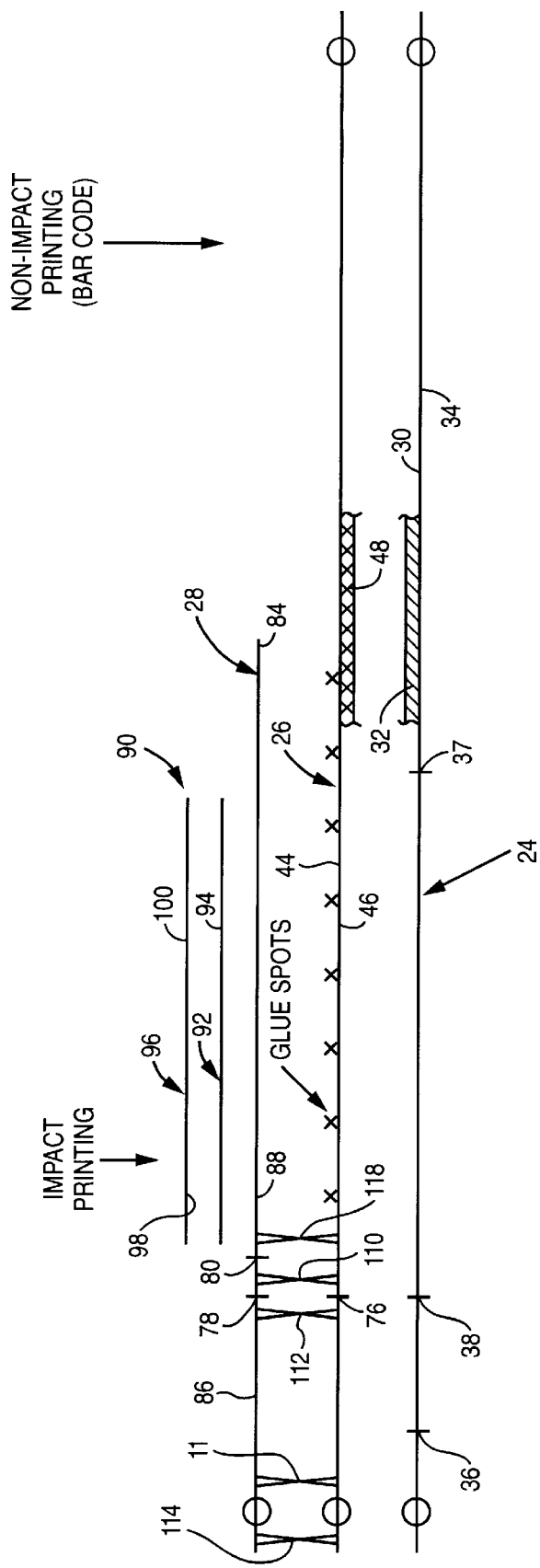
FIG. 2 is a section view of the form illustrated in FIG. 1, but shown in schematic form.

With reference initially to FIGS. 1 and 2, a business form construction 10 is provided in the form of a waybill. The form includes side edges 12 and 14 along with end edges 16, 18. As will be understood by those skilled in the art, the end edges 16, 18 are formed by tearing along transverse perforation lines connecting the form 10 to similar forms in a continuous web format. Tractor drive openings 20 and 22 are provided along opposite margins, adjacent the side edges 12 and 14. The tractor openings extend through all plies of the form and facilitate feeding of the continuous web of forms through a printer.

Form 10 has three plies, a base ply 24, an intermediate ply 26, and a top ply or flap 28. The base ply 24 is a paper sheet coated on its upper surface 30 with a conventional release coating 32 (see cut-out in FIG. 1). The base ply 24 extends to and defines the side and end edges of the form. The lower surface 34 of ply 24 may be printed with, for example, instructions for using the form. The base ply 24 also contains parallel perf cut lines 36, 38 on the left side of the form. The line 38 partially defines a stub portion of the form as described further below. A third die cut line 37 is provided approximately midway along the width of the form, further facilitating the separation of the lower and intermediate plies (by, for example, peeling the base ply or release sheet off the intermediate ply).

The intermediate ply 26 also extends substantially the full length and width of the lower ply 24, but its end edges 40, 42 lie just inside the end edges 16, 18 of the lower ply, to facilitate peeling away from the base or lower ply. The ply 26 has an upper surface 44 and a lower surface 46, the latter coated with a conventional pressure sensitive, permanent adhesive 48. The upper surface 44 of the intermediate ply 26 is pre-printed to the right of upper ply 28 with indicia applied by non-impact printers such as commercially available magnetographic printers from Nipson Bull Corporation. Other non-impact techniques, including laser printing, may also be employed. The indicia preferably includes at least a bar code 50 and, in the preferred embodiment, identification numbers (for example, tracking numbers) provided on separable tabs 52, 54 having a die cut or perforated edges 56, 58, 60 and 62. The information illustrated here is merely exemplary and may include other kinds of information as well.

Figure 3:
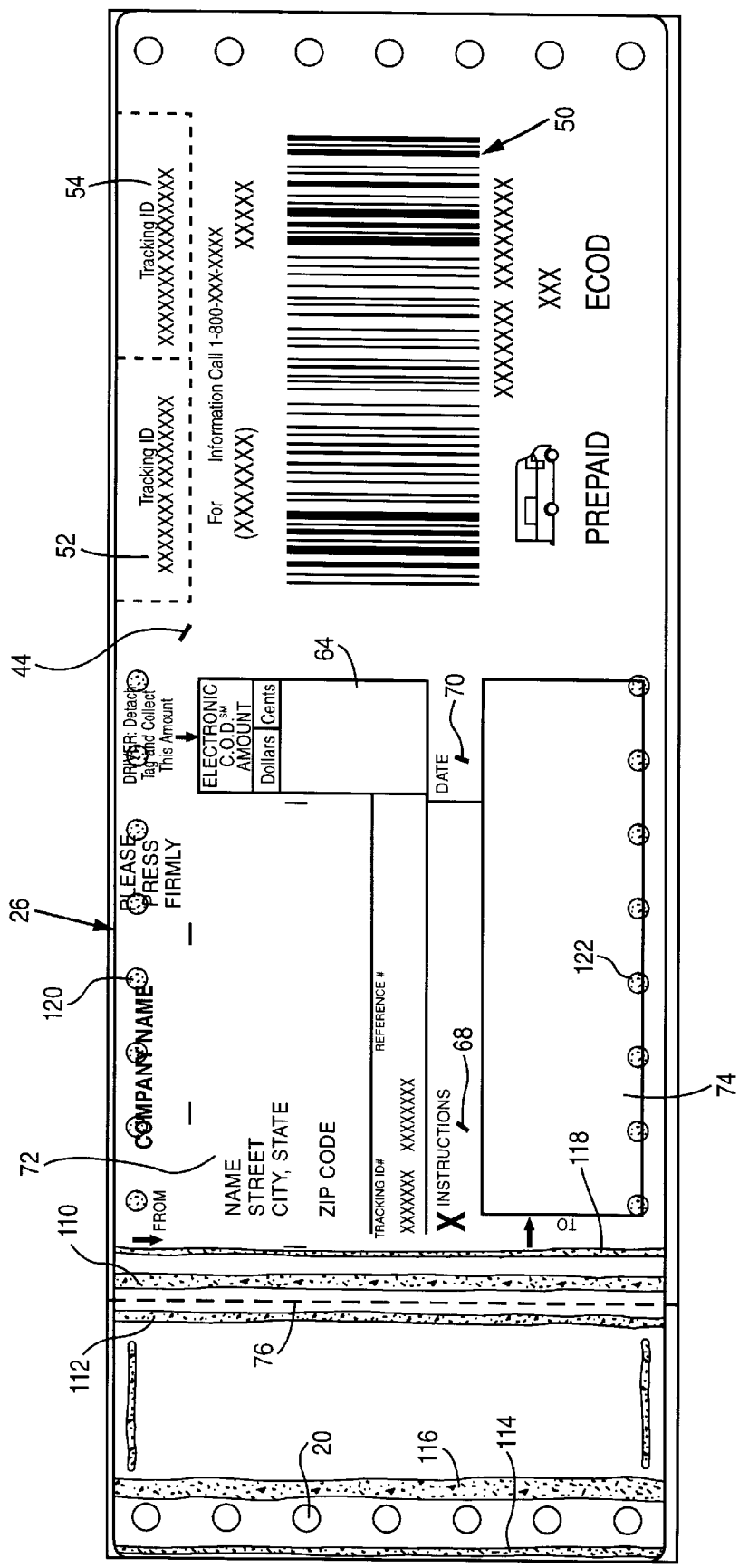
FIG. 3 is a top plan view of the form shown in FIG. 1 but with the upper flap portion or ply removed.
Figure 4:
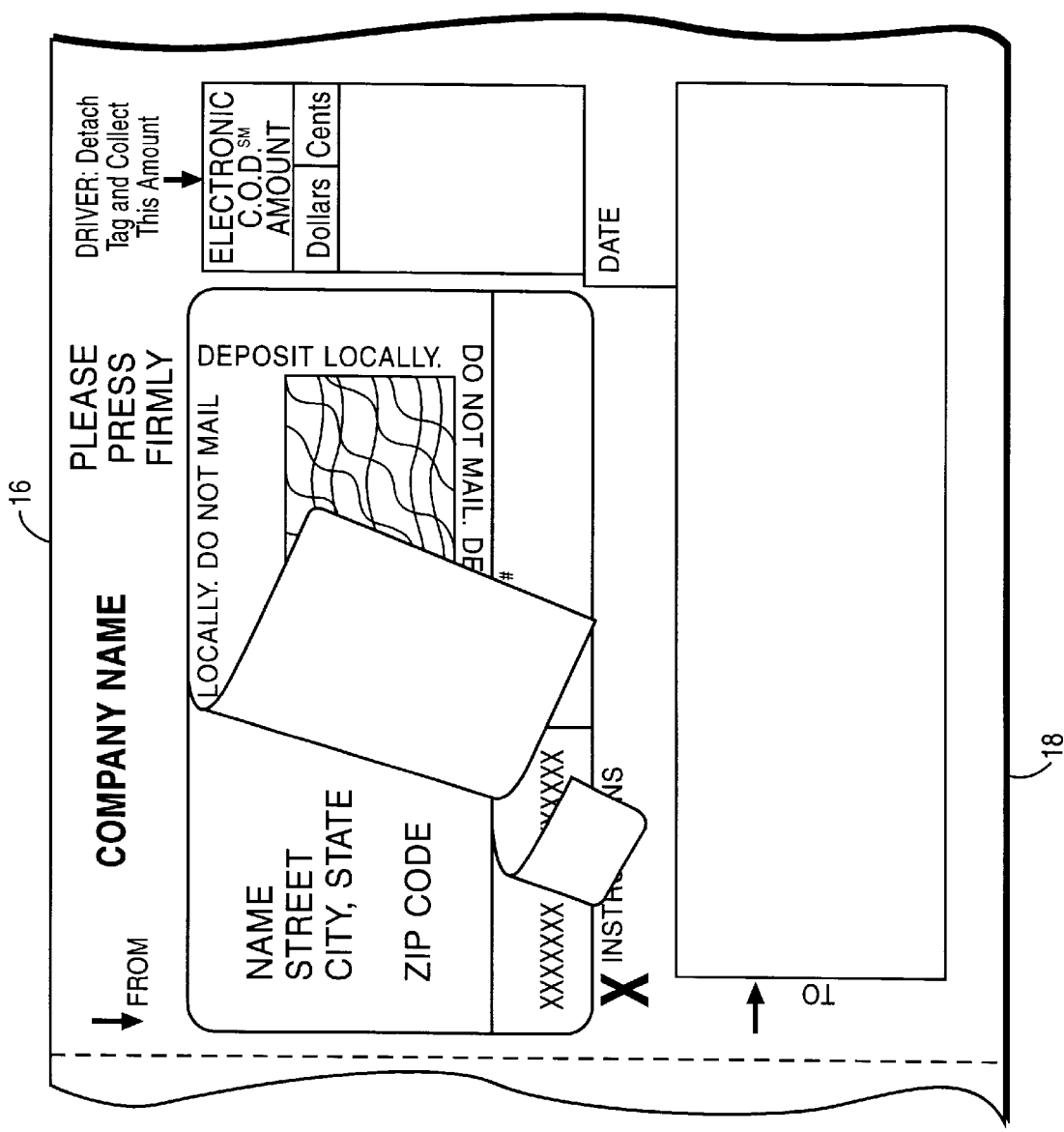
FIG. 4 is an enlarged detail of the upper flap portion shown in FIG. 1, and illustrating the label construction applied to the upper flap or ply.

With specific reference to FIG. 3, on the left side of the ply 26, the upper surface 44 is also pre-printed with indicia including, for example, a COD amount box 64, special instruction area 68, and a date area 70. Information prompts lie adjacent blank spaces 72 and 74 which are provided for receiving variable information (including FROM and TO address information) through the top ply 28 by means of an impact printer. To this end, the upper surface 44 of ply 26 is also provided with a CF coating but only in that area which underlies the top ply or flap 28. The intermediate ply 26 is also provided with a line 76 overlying the perf line 38 on the lower ply.

The top ply or flap 28 extends rightward from left side edge 12 of the form, and tractor openings 20 along the left margin, as well as parallel perf lines 78,80, line 78 which overlying the perf lines 76 and 38, the form to the left of these perf lines comprising a shipper receipt 82. Ply 28 extends rightward to an edge 84 located approximately midway between the perf line 80 and the edge 14. Ply 28 has upper and lower surfaces 86, 88 with indicia on the upper surface 86 corresponding substantially to the indicia on the left side of the intermediate ply 26 between edge 84 and perf line 80. The lower surface 88 has a CB coating applied thereto.

Within a space corresponding to that shown at 72 on the upper surface 44 of the intermediate ply 26, a two-part label assembly 90 is applied to the top ply or flap 28. The label assembly comprises a label lower part 92 on the upper surface 86 of ply 28 overlying the space 72 on intermediate ply 26. The lower label part includes a polyethylene film or coating applied to the designated label area of ply 28, overlaid by a silicone coating and a CF coating. The lower label part thus serves as a release layer for the label upper part described below. The upper part 96 of the label assembly comprises paper stock, the underside of which is coated with polyethylene, silicone, an adhesive and a CB coating. The self-contained label system may be as described in commonly owned U.S. Pat. No. 5,525,569, incorporated herein by reference.

The upper surface 100 of the label upper part is adapted to receive variable information by impact printing, with a sender name clearly visible, and a sender address hidden behind a screen coating 104. The upper label part also has separable tabs 106, 108 for receiving, for example, tracking and reference ID numbers, again by impact printing. The information applied to the upper label part 86 is transferred onto the lower label part 92 (and thus ply 28) through the carbonless image transfer system, noting that the address information hidden on the upper label part is clearly visible on the upper surface of the lower label part. At the same time, this information is transferred to the appropriate corresponding space on the upper surface 44 of the intermediate ply 26.

Again, that portion of upper ply 28 to the left of perf line 78 serves as a shipper receipt or stub, and may include additional information as indicated in FIG. 1, impact printed on the form.

Glue lines 110, 112 on either side of perf lines 76, 78 permanently adhere the shipper receipt portion of the upper ply to a corresponding portion of the intermediate ply 26. Additional permanent glue lines 114, 116 secure the upper ply to the intermediate ply on either side of the tractor holes 20.

Still another glue line 118 extends adjacent line 110 remote from perf line 76. The latter glue line 118 is of the non-permanent type, easily overcome when the ply 28 is pulled away from the intermediate ply, along the perf line 80. Further in this regard, transverse lines of non-permanent glue dots 120 and 122 are provided along edges 40 and 42 of the intermediate ply 26, on upper surface 44. These two adhesive dot lines 120 and 122 along with glue line 118 serve to temporarily hold the upper ply 28 down on the intermediate ply 26 while the customer impact prints on the form with, for example, a dot matrix printer. They also hold the flap 28 in place during shipping and handling, but permit easy removal of the upper ply or flap 28 from the intermediate ply.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-ply business form comprising at least a lower ply and an upper ply wherein said upper ply overlies only a portion of said lower ply, leaving a first portion of said lower ply exposed in adjacent relationship to said upper ply; a two part label on said upper ply including a release layer on a relatively small part of said upper ply, and an adhesive label overlying said release layer; said release layer and said adhesive label having information impact printed thereon; wherein said exposed portion of said lower ply has information non-impact printed with information; and wherein said upper ply is temporarily adhesively secured to said lower ply along at least two edges of said upper ply; and further wherein a receipt stub is provided along one side of the form, connected thereto by aligned perf lines in at least the upper and lower plies thereof.

2. The form of claim 1 wherein said lower ply is temporarily adhesively secured to a base ply having a release coating on an upper surface thereof.

3. The form of claim 1 wherein said non-impact printed information includes a bar code.

4. The form of claim 1 wherein said label upper ply includes plural separable sections.

5. The form of claim 1 wherein said lower ply includes plural separable sections.

6. The form of claim 1 wherein a receipt stub is provided along one side of the form, connected thereto by aligned perf lines in at least the upper and lower plies thereof.

7. The form of claim 1 wherein said upper ply is temporarily secured to said lower ply by a plurality of adhesive dots extending along at least two edges of said upper ply.

8. The form of claim 1 wherein said release layer of said two part label has a CF coating thereon.

9. The form of claim 8 wherein said adhesive label has a CB coating on a lower surface thereof.

10. The form of claim 9 wherein said lower ply has a CF coating on a portion of the upper surface which underlies said upper ply.

11. A business form construction in a continuous web wherein plural forms are connected by perforation lines extending in a direction transverse to a feeding direction of said web, each form within the web comprising:

a base ply having a release coating on an upper surface thereof;

an intermediate ply temporarily adhesively secured to said base ply and having non-impact printing at least on an exposed portion of an upper surface thereof; and an upper ply partially overlying the upper surface of the intermediate ply, said upper ply configured to be impact printed in an area adjacent said exposed portion of said intermediate ply.

12. The form construction of claim 11 wherein said upper ply is temporarily secured to said intermediate ply along at least two edges of said upper ply.

13. The form construction of claim 12 wherein said upper ply is temporarily secured to said intermediate ply along at least three edges of said upper ply.

14. The form construction of claim 11 wherein said upper ply has a two part label construction on said upper ply, said label construction including a release layer applied to the upper surface of the upper ply and an adhesive label temporarily secured to said release layer, said two part label construction, said upper ply and said intermediate ply incorporating carbonless image transfer images for receiving variable information by impact printing, which information is transferred to said release layer on said upper ply and to said intermediate ply.

15. The form construction of claim 14 wherein said adhesive label has plural separable portions.

* * * * *